(12) United States Patent
Lundy

(10) Patent No.: US 7,305,442 B1
(45) Date of Patent: Dec. 4, 2007

(54) ASYNCHRONOUS USER-AUTHORIZED ADVERTISING

(75) Inventor: Michael T. Lundy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1007 days.

(21) Appl. No.: 09/976,801

(22) Filed: Oct. 12, 2001

(51) Int. Cl.
*G06F 15/16* (2006.01)
*G06Q 30/00* (2006.01)

(52) U.S. Cl. .................. 709/206; 709/227; 455/412.1; 705/14

(58) Field of Classification Search .................. 706/26; 725/32, 34–36, 42; 455/412.1, 412.2; 705/14; 709/206, 216, 227
See application file for complete search history.

(56) References Cited

U.S. PATENT DOCUMENTS

| | | | |
|---|---|---|---|
| 5,852,775 A | 12/1998 | Hidary | |
| 6,021,443 A * | 2/2000 | Bracho et al. | 709/241 |
| 6,185,306 B1 * | 2/2001 | Mages et al. | 380/203 |
| 6,317,761 B1 * | 11/2001 | Landsman et al. | 715/513 |
| 6,415,438 B1 * | 7/2002 | Blackketter et al. | 725/136 |
| 6,442,529 B1 * | 8/2002 | Krishan et al. | 705/14 |
| 6,456,981 B1 * | 9/2002 | Dejaeger et al. | 705/14 |
| 6,470,079 B1 * | 10/2002 | Benson | 379/114.13 |
| 6,532,489 B1 * | 3/2003 | Merchant | 709/206 |
| 6,622,174 B1 * | 9/2003 | Ukita et al. | 709/246 |
| 6,647,257 B2 * | 11/2003 | Owensby | 455/414.1 |
| 6,698,020 B1 * | 2/2004 | Zigmond et al. | 725/34 |
| 6,704,773 B1 * | 3/2004 | Cohn et al. | 709/217 |
| 6,708,205 B2 * | 3/2004 | Sheldon et al. | 709/206 |
| 6,718,551 B1 * | 4/2004 | Swix et al. | 725/32 |
| 6,892,354 B1 * | 5/2005 | Servan-Schreiber et al. | 715/733 |
| 6,928,413 B1 * | 8/2005 | Pulitzer | 705/14 |
| 6,928,439 B2 * | 8/2005 | Satoh | 707/9 |
| 6,948,070 B1 * | 9/2005 | Ginter et al. | 713/193 |
| 6,950,804 B2 * | 9/2005 | Strietzel | 705/26 |
| 7,007,041 B2 * | 2/2006 | Multer et al. | 707/201 |
| 7,035,914 B1 * | 4/2006 | Payne et al. | 709/219 |
| 7,039,678 B1 * | 5/2006 | Halahmi et al. | 709/206 |
| 7,058,601 B1 * | 6/2006 | Paiz | 705/37 |
| 7,099,831 B2 * | 8/2006 | Mitsuoka et al. | 705/14 |
| 7,140,045 B2 * | 11/2006 | Gudorf et al. | 726/28 |
| 7,181,412 B1 * | 2/2007 | Fulgoni et al. | 705/10 |
| 2002/0147638 A1 * | 10/2002 | Banerjee et al. | 705/14 |
| 2003/0037028 A1 * | 2/2003 | Akhteruzzaman et al. | 707/1 |

FOREIGN PATENT DOCUMENTS

WO   WO 99/59283   11/1999

OTHER PUBLICATIONS

"Permission E-Mail: The Future of Direct Marketing", ITM Strategies (1999).
"About Permission E-Mail", (visited Oct. 11, 2001), www.yesmail.com/learn.
"Taking bite out of spam will require sharp teeth", Chicago Tribune (Apr. 5, 2001).

* cited by examiner

*Primary Examiner*—Andrew Joseph Rudy

(57) ABSTRACT

A system and method for advertising on a subscriber terminal. A server may send an advertising authorization request to the subscriber terminal. The advertising authorization request may comprise options that a user may select for accepting or rejecting an advertisement to be sent to the subscriber terminal. If the subscriber terminal accepts the advertisement, the server or subscriber terminal may wait for one or more triggering events to occur. The triggering events may include the subscriber terminal being idle, substantially stationary, and/or a specific time of day. Upon occurrence of the one or more triggering events, the subscriber terminal may display the advertisement on its display screen.

9 Claims, 7 Drawing Sheets

ADVERTISING AUTHORIZATION REQUEST

BY ACCESSING THIS SITE YOU AGREE TO

RECEIVE 1 ADVERTISEMENT(S) FROM THE

SITE SPONSOR THAT WILL BE SENT AT A

MORE CONVENIENT TIME

1> YES THIS TIME
2> YES ALWAYS
3> CANCEL.

FIG. 5

ASYNCHRONOUS USER-AUTHORIZED ADVERTISING

BACKGROUND

1. Field of Invention

This invention relates to advertising and more particularly to a method and system for user-authorized advertising over communications networks.

2. Description of Related Art

Recently, businesses have begun to take advantage of advances in communications technology. Communications networks, such as the Internet, connect millions of people all around the world. These communications networks may permit businesses to send a vast array of information to consumers. One type of information that businesses may send is advertisements. Advertisements may take the form of information about the business, its products and/or its services. Consumers may receive these advertisements on a computer or wireless terminal, for example, connected to the communications networks.

The simplest of all advertisements sent over communications networks may be an electronic mail ("e-mail") advertisement. The e-mail advertisement is typically a text-message that a business may send to advertise a particular product or service. The e-mail advertisement may have no graphics and limited formatting (e.g., italics and bolding) so that it may be easily transported over the communications networks. The e-mail advertisement is usually addressed, using an "email address," to a user of a computer. A computer or wireless terminal may receive the e-mail advertisement and may store the e-mail in an "in-box." The user may then open the "in-box" to read the e-mail advertisement.

If the communications networks to which the computer or wireless terminal is connected effectively transport graphics and animation, businesses may send "banner" advertisements. Banner advertisements typically comprise graphics and/or animation displayed in a web-page. Banner advertisements may stretch across the web-page, similar to how a banner may stretch across a roadway. Unlike traditional advertising methods, banner advertisements may allow a user to interact with the advertisement. The banner advertisement may have a Universal Resource Locator (URL) link. If the user selects (e.g., by "clicking") the URL of the banner advertisement, the user may obtain additional information about the advertiser and its products or services. A user might not be able to obtain such information from just viewing a television commercial or newspaper advertisement, for example.

Similar to banner advertisements, advertisers may also send pop-up advertisements. Pop-up advertisements are typically web-page advertisements sent over the communications networks. The pop-up advertisement may appear as a window in the foreground of a display screen of the computer or wireless terminal. The window may cover the entire display or a portion of the display. Advertisers may find pop-up advertisements to be effective advertising methods because the pop-up advertisements interrupt the user's activity. By being in the foreground, the user must view the advertisement. Like the banner advertisements, the pop-up advertisement may also have a URL link. The URL may enable a user to obtain additional information about the business and/or its goods and services.

SUMMARY

The present invention stems from a realization that advertising over communications networks may be interruptive to a user. Advertisements sent over communications networks typically have text, graphic, and/or animation. As such, the advertisements may interrupt the user's activity because the user may have to wait for the advertisements to load on a subscriber terminal before the user may continue with his activity. Additionally, the advertisements may interrupt the user's activity because the user may not wish to view advertisements that he did not solicit. Therefore, it would be advantageous to have a more efficient method and system for advertising over a communications network.

One way to efficiently advertise is to ask whether the user wishes to receive an advertisement. A business may invite a user to submit his e-mail address on a web-page in order to receive occasional announcements and promotional offers in the form of e-mails. The idea is that the advertisement may be less interruptive to a user if the user authorizes the sending of the advertisement. The user, however, may still not be receptive to the advertisement. For example, the user may receive the advertisement when he is trying to complete an activity on the subscriber terminal. In such a case, the user may simply ignore the advertisement.

In accordance with a principle aspect of the present invention, advertising may be performed on a server and a subscriber terminal. The server may send an advertising authorization request over a communications network to the subscriber terminal. The advertising authorization request may comprise user-selectable options for accepting or rejecting an advertisement from the server.

The subscriber terminal may send the user's reply to the advertising authorization request to the server. If the subscriber terminal accepts the advertisement, the server and/or subscriber terminal may wait for one or more triggering events to occur before sending/displaying the advertisement. The triggering events may include the subscriber terminal being idle, the subscriber terminal being substantially stationary, and/or the occurrence of a specific time of day such as "dinner time."

In a first exemplary embodiment, the server may wait for the one or more triggering events to occur. In response to occurrence of one or more of the triggering events, the server may send the advertisement to the subscriber terminal and the subscriber terminal may display the advertisement on the display screen. In a second exemplary embodiment, the server may send the advertisement to the subscriber terminal and the subscriber terminal may store the advertisement in memory. The subscriber terminal may then wait for the one or more triggering events to occur. In response to occurrence of the one or more triggering events, the subscriber terminal may display the advertisement on its display screen.

The type of advertisement that the server sends may depend upon the type of subscriber terminal. For example, if the subscriber terminal is a cellular telephone, the advertisement may be defined by a short message service (SMS) message or wireless access protocol (WAP) card. If the subscriber terminal is a computer, then the advertisement may be an HTML web-page or a downloadable program (e.g., Java applet). Other arrangements are also possible.

These as well as other aspects and advantages of the exemplary embodiments will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 5 is an illustration of an advertising authorization request;

DETAILED DESCRIPTION OF EXEMPLARY EMBODIMENTS

A. Architecture for Facilitating Network-Based Advertising

Figure 1:
FIG. 1 is a block diagram illustrating a landline computer coupled to a communications network.
Figure 2:
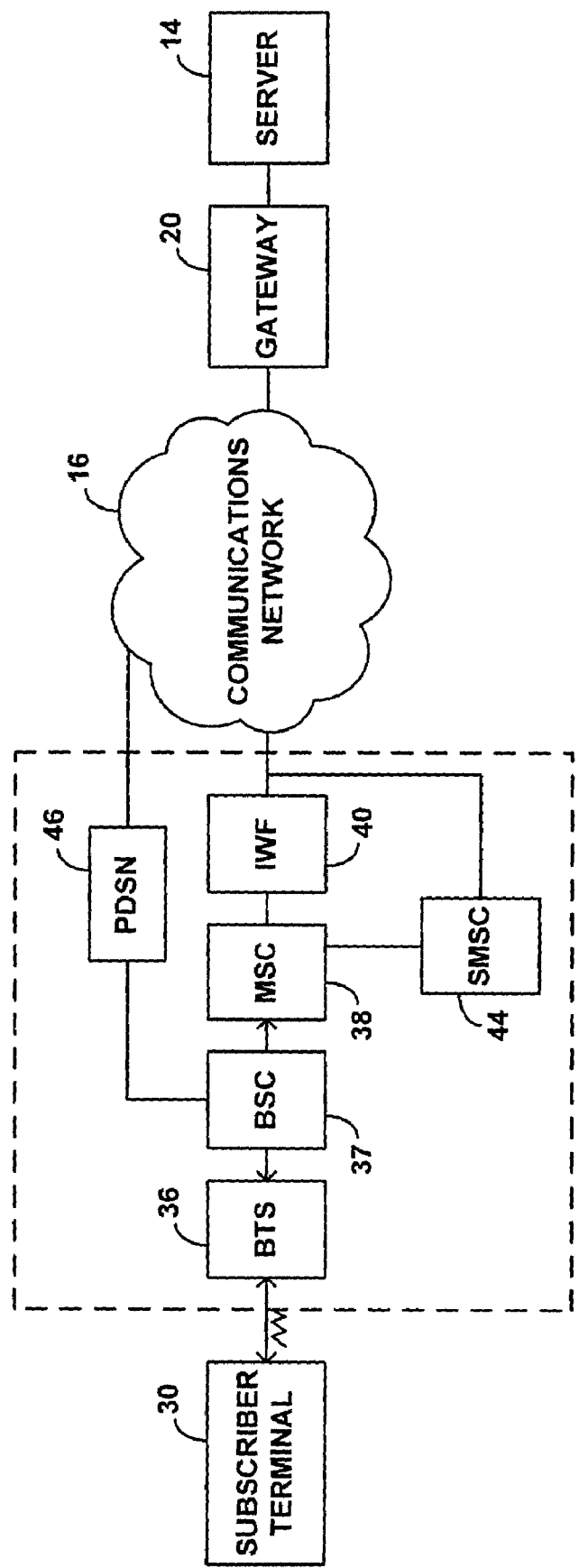
FIG. 2 is a block diagram illustrating a wireless terminal coupled to the communications network.

Referring to the drawings, FIGS. 1 and 2 illustrate block diagrams of communications networks in which exemplary embodiments of the present invention may be employed. Those skilled in the art will appreciate that other architectures can be used instead, additional elements may be added to these architectures, and some elements may be omitted altogether. Further, those skilled in the art will appreciate that many of the elements described herein are functional entities that may be implemented as discrete components or in conjunction with other components, in any suitable combination or location.

Still further, various functions described herein as being performed by one or more entities may be carried out by a processor programmed to execute an appropriate set of computer instructions stored in memory. Provided with the present disclosure, those skilled in the art can readily prepare the appropriate set of computer instructions (e.g., software) to perform such functions.

By way of example, FIG. 1 illustrates a simplified architecture whereby a subscriber terminal 12, e.g., a landline terminal, may communicate with a server 14 over a communications network 16. The server may be a single or multiple processor-based system for sending and receiving content over the communications network 16. In the arrangement shown in FIG. 1, the subscriber terminal 12 is coupled by a first gateway 18 to the communications network 16. Similarly, the server 14 is coupled by a second gateway 20 to the communications network 16. Gateways 18 and 20 each provide connectivity to the communications network 16.

The communications network 16 enables the server 14 and the subscriber terminal 16 to exchange data traffic. In an exemplary embodiment, the communications network 16 may support TCP/IP (Transmission Control Protocol/Internet Protocol). According to TCP/IP, the network devices (e.g., the subscriber terminal 12 and server 14) may be assigned an IP address. The IP address may be a unique address that identifies the network device and its location on the communications network 16. For example, a first network device (e.g. server 14) may use the IP address to send content to the second network device (e.g., subscriber terminal 12). Routers and bridges (not shown) within the communications network 16 may use the IP address to route the data traffic across the communications network 16.

FIG. 2 illustrates an exemplary network architecture for facilitating communications between a wireless subscriber terminal 30 (e.g., a computer with wireless modem or a cellular telephone) and the communications network 16. The subscriber terminal 30 may communicate with the communications network 16 via a base transceiver station (BTS) 36, a base station controller (BSC) 37, a mobile switching center (MSC) 38, and an interworking function (IWF) 40. The BTS 36 may transmit and receive signals from the subscriber terminal 30 within a cell in which the subscriber terminal 30 is operating. The BSC 48 may then aggregate the signals from a plurality of BTSs. The MSC 38 may address content (e.g., voice and data) to and from the subscriber terminal 30 using a unique address (e.g., Subscriber ID or Mobile Identification Number—MIN) to identify the subscriber terminal 30. The "interworking" function (IWF) 40, connected to the MSC 38, may, in turn, serve as a wireless/IP gateway. The IWF 40 may reformat data from the wireless subscriber terminal 30 into packets for transmission over the communications network 16.

The MSC 38 may not only be connected to an IWF 40. The MSC 38 may also be coupled to a short message service center (SMSC) 44. The SMSC 44 may be a functional entity that stores and forwards short messages between the subscriber terminal 30 and the server 14. Short messages are text-messages that may be sent to/from a wireless terminal 30 without establishing an active call session. For example, the SMSC 44 may send an SMS message to a short message entity (SME). The SME may be a software application residing on the subscriber terminal 30. The function of the SME may be to compose, store, dispose, act upon, and display short messages.

Other arrangements are also possible for exchanging data with the communications network 16. For example, in a "3G" mobile network, the network of FIG. 2 may additionally or alternatively include a packet data serving node (PDSN) 46. The PDSN 46 may receive data from the BSC 48 and route the data to the communications network 16. In this arrangement, the data carried between the wireless subscriber terminal 30 and the PDSN 46 may be in the form of packets.

Figure 3:
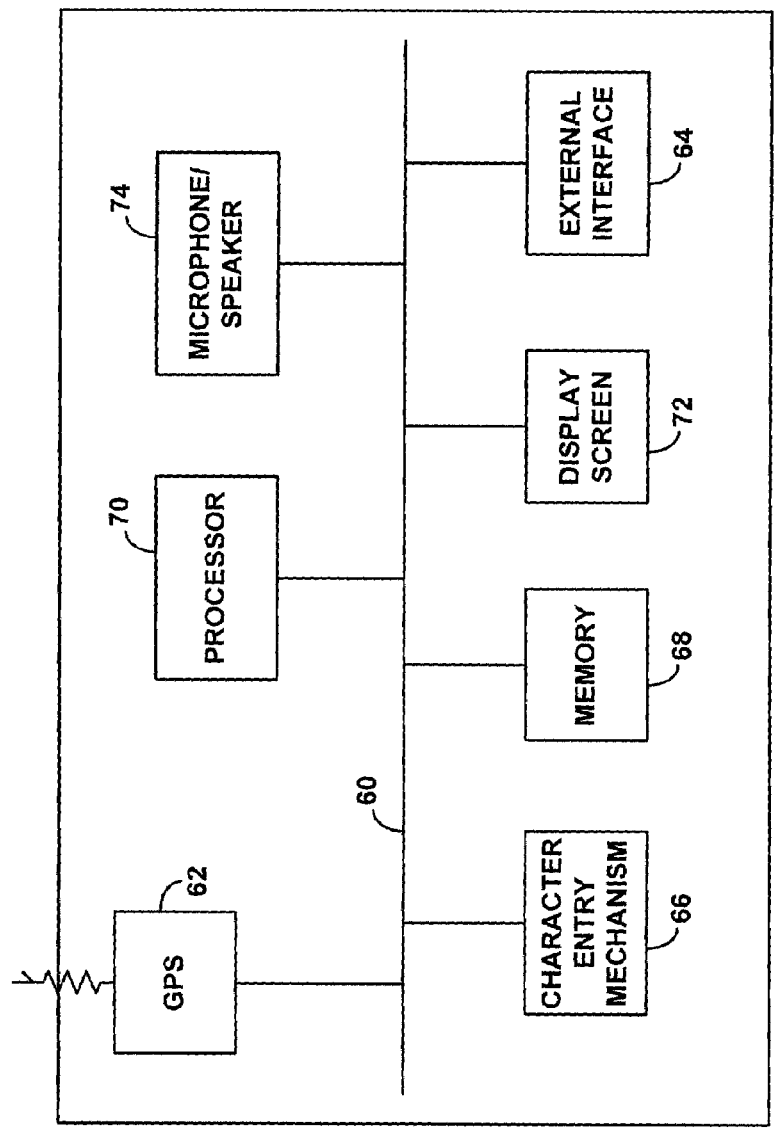
FIG. 3 is a block diagram illustrating functional blocks of a subscriber terminal.

FIG. 3 is a simplified block diagram illustrating functional blocks of an exemplary subscriber terminal 12, 30 (FIGS. 1 & 2). A bus 60 on the subscriber terminal may facilitate communications between a processor 70, memory 68, a display screen 72, a character-entry mechanism 66, an external interface 64, and a GPS transceiver 62.

The memory 68 is preferably a medium for storage such as Random Access Memory (RAM), Read Only Memory (ROM), or a hard drive. The memory 68 may store computer instructions executable by the processor 70. The display screen 72 may be, for example, a Cathode Ray Tube (CRT) as commonly found on desktop computers or a Liquid Crystal Display (LCD) screen as commonly found on cellular telephones or portable computers. The display screen 72 may display content transmitted and received over the communications network 16. The character entry mechanism 66 may be a keyboard or a numeric keypad that accepts user-input. The microphone/speaker 74 may facilitate audio communications.

The subscriber terminal may communicate with the server 14 using the external interface 64. The external interface 64 may include a transmitter circuit, receiver circuit, and/or a transceiver circuit. These circuits may facilitate wireless communications with the BTS 36 or wired communications with the gateway 18. Of course, other arrangements are also possible.

The wireless subscriber terminal 30 may also have a GPS transceiver 62. The GPS transceiver 62 may facilitate communication with a GPS satellite system so as to determine the location of the subscriber terminal 30. For example, the processor 70 may be programmed to receive its location coordinates using a GPS transceiver (e.g., longitude and latitude coordinates) and then report its location to the MSC 38.

B. Exemplary Methods for Network-Based Advertising

The term advertising may be defined as "announcing information." In one exemplary embodiment, an advertisement may contain information about a product or service offered by business. In a second exemplary embodiment, the advertisement may contain information about an event such as a promotional offer. Of course, the exemplary embodiments of the present invention are not limited by the type or nature of information announced in the advertisement.

Figure 4:
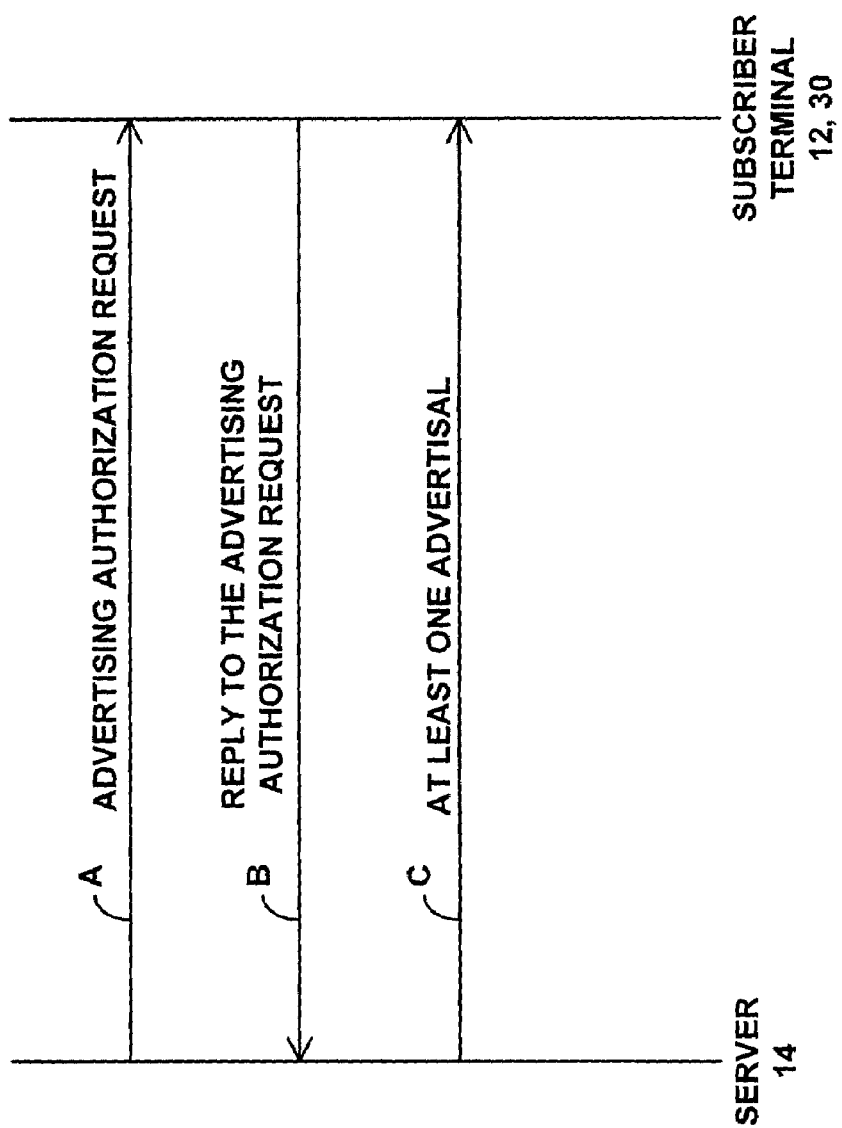
FIG. 4 is an advertising process flow depicting communications between a server and a subscriber terminal.

FIG. 4 illustrates an advertising process flow between the server 14 and the subscriber terminal 12, 30 (FIGS. 1 & 2). The call flow illustrates communications between the server 14 and the subscriber terminal over the communications network 16 in accordance with an exemplary embodiment of the present invention.

The server 14 may have computer instructions for outputting an advertising authorization request. The advertising authorization request may ask a user of the subscriber terminal to accept or reject an advertisement from the server 14. Moreover, the advertising authorization request may request that the user select to receive a single advertisement or multiple advertisements from the server. The advertising authorization request may be defined by a web-page, a card that pops up in the foreground of the display (i.e., pop-up window), or some other form. At step A, the server 14 may send the advertising authorization request to the subscriber terminal.

The server may send the advertising authorization request in response to one or more stimuli. For example, a user may enter a Universal Resource Locator (URL) on the subscriber terminal to connect to a server 14. The URL is typically a string (e.g., "www.advertise.com") that identifies a resource on the communications network. When the subscriber terminal connects to the server 14, the server 14 may send the advertising authorization request. Alternatively, the server 14 may send the advertising authorization request after a period of time has elapsed. Other arrangements are also possible.

The user of the subscriber terminal may reply to the advertising authorization request. For example, the user may select an option of the advertising authorization request to indicate acceptance or rejection of the advertisement (i.e., user-indication). In response to a selection, the subscriber terminal may have computer instructions for outputting a reply. The reply may indicate the user's response to the advertising authorization request. At step B, the subscriber terminal may send the reply to the server 14.

The server 14 may receive the reply to the advertising authorization request and make a determination whether to send an advertisement to the subscriber terminal. If the reply indicates rejection of the advertisement, the server 14 may be programmed not to send the advertisement. If the reply indicates acceptance of the advertisement, the server may have computer instructions for outputting the advertisement. At step C, the server 14 may send the advertisement to the subscriber terminal.

The server 14 may send the advertisement in response to one or more triggering events occurring, such as the subscriber terminal being idle, the subscriber terminal being substantially stationary, or the occurrence of a specific time of day. The subscriber terminal may receive the advertisement and display it on the display screen 72. Alternatively, the server 14 may send the advertisement to the subscriber terminal in response to receiving the reply. The subscriber terminal, however, might be programmed to display the advertisement in response to the occurrence of the one or more triggering events. Of course, other arrangements are also possible for making a determination when the advertisement is displayed on the subscriber terminal.

The form of the advertisement may depend on the type of subscriber terminal (e.g., landline or wireless). For example, if the subscriber terminal 12 is a computer, then the advertisement may be defined by an electronic mail, an instant message (i.e., real-time electronic mail), an HTML webpage, or a downloadable program such as a JAVA applet that may execute on the subscriber terminal 12. The advertisement may pop-up in the foreground of the display and include sound and color graphics (if supported by the display screen 72). Alternatively, if the subscriber terminal 30 is a wireless terminal such as a cellular telephone, then the advertisement may be defined by an SMS message or Wireless Application Protocol (WAP) card. Other arrangements are also possible.

In the exemplary embodiments described so far, a single server 14 may send the advertising authorization request and the advertisement. Of course, the functions may be distributed over multiple servers. For example, a first server may attempt to obtain authorization from the user of the subscriber terminal to send the advertisement. If authorization is received, the first server may send a message to a second server. The message may indicate to the second server that an advertisement may be sent to the subscriber terminal. The second server may then send the advertisement. Other arrangements are also possible.

In the exemplary embodiments described so far, the server 14 also sends an advertising authorization request each time the subscriber terminal connects to the server 14. The server 14, however, need not send the advertising authorization request each time the subscriber terminal connects to the server 14.

In an alternative exemplary embodiment, the server 14 may be programmed to store in memory 68 each reply that it receives from subscriber terminals as the subscriber terminals reply to the advertising authorization request. When a subscriber terminal connects to the server 14, the server 14 may attempt to retrieve a reply from memory. The reply in memory may correspond to the reply that the subscriber terminal may have sent to the server 14 during an earlier connection. The server 14 may retrieve the reply, for example, by comparing the IP address, subscriber ID, or MIN, of the subscriber terminal with that of the reply in memory. If a reply is found in memory for the subscriber terminal, then the server 14 need not send an advertising authorization request to the subscriber terminal. Instead, the server 14 may use the reply stored in memory to determine whether to send advertisements to the subscriber terminal. If the reply indicates acceptance of advertisements, the server 14 may send the advertisements to the subscriber terminal. Of course, other arrangements are also possible.

1. Advertising Authorization Request

FIG. 5 illustrates an exemplary embodiment of the advertising authorization request 82 sent from the subscriber terminal to the server 14 at step A. The advertising authorization request 82 may comprise a set of user-selectable options for enabling the user to indicate acceptance or rejection of an advertisement from the server 14. The user may indicate acceptance of one or more advertisements, for example, by selecting options 1 or 2 of the advertising authorization request, respectively. The user may indicate rejection of an advertisement, for example, by selecting option 3 of the advertising authorization request 82. The user may indicate acceptance or rejection by pressing the digit associated with the desired options 80 on the character entry mechanism 66. Of course, user-selectable options not illustrated in FIG. 5 may also be present on the advertising authorization request 82. Moreover, other arrangements are also possible for indicating selection of an option 80.

If the subscriber terminal is a landline computer, the advertising authorization request may take the form of an HTML web page. HTML, Hyper-Text Markup Language, is a well-known authoring language for creating web pages on a Hyper Text Transfer Protocol (HTTP) network. If the subscriber terminal is a cellular telephone, the advertising authorization request may take the form of a WAP card. A browser running on the subscriber terminal may receive the HTML web-page or WAP card and display the advertising authorization request 82 on the display screen.

Of course other markup languages are possible for encoding the advertising authorization request 82. For example, the advertising authorization request may take the form of web page encoded in eXentesible Markup Language (XML) or a card encoded in Handheld Device Markup Language (HDML) or Compact Hyper-Text Markup Language (cHTML). For purposes of illustration, however, the exemplary embodiments of the present invention will assume that the subscriber terminal exchanges either a HTML web-page or a WAP card with the server 14.

2. Reply to the Advertising Authorization Request

The browser running on the subscriber terminal may send a reply to the server 14 corresponding to the selected option. The reply 44 may be an indication of a particular choice item of the advertising authorization request. The markup languages described above support the capability for communicating the selected choice item to the server 14.

Figure 6:
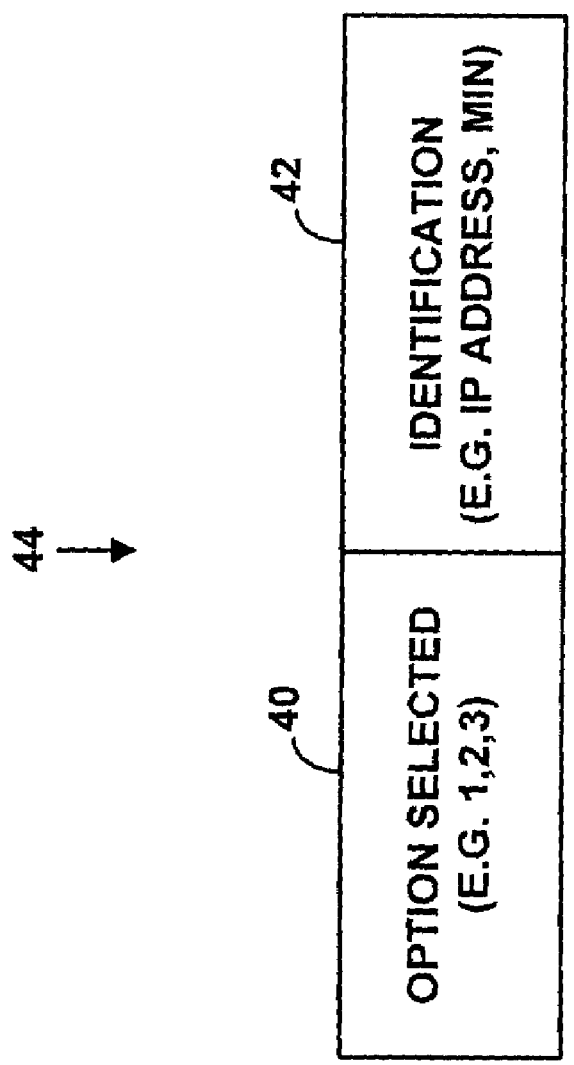
FIG. 6 is an illustration of a reply to the advertising authorization request.

FIG. 6 illustrates an exemplary embodiment of the reply sent from the subscriber terminal to the server 14 at step B. The reply 44 may be a data structure having a first field 40 and a second field 42. The first field 40 may identify one of the options 80 (FIG. 5) selected by the user of the subscriber terminal. For example, the first field 40 may be encoded with the digit corresponding to the option selected. The second field 42 may comprise an identification of the subscriber terminal. For example, the second field may have the IP address, subscriber ID, or MIN identifying the replying subscriber terminal. The reply 44 may further comprise other fields and alternative fields from those illustrated herein.

3. Triggering Events Defining Transmission and Display of the Advertisement

At step C of FIG. 3, the server 14 may send the advertisement to the subscriber terminal. The server 14, subscriber terminal, and/or various network entities, however, may delay transmission and/or display of the advertisement. For example, the server 14 may send the advertisement to the subscriber terminal in response to receiving the reply 44 to the advertising authorization request 82. The subscriber terminal may receive the advertisement, but wait to display the advertisement on the display screen 72 until one or more triggering events occur. Alternatively, the server 14 may receive the reply 44 to the advertising authorization request 82, but wait to send the advertisement to the subscriber terminal. After the occurrence of the one or more triggering events, the server 14 may send the advertisement to the subscriber terminal and the subscriber terminal may display the advertisement on the display screen 72. Of course, other arrangements may serve to delay the transmission and display of the advertisement on the display screen 72.

The triggering events may include the subscriber terminal being idle, the subscriber terminal being substantially stationary, and/or the occurrence of a specific time of day. The subscriber terminal and/or the server 14 may wait for the occurrence of these one or more of these triggering events before displaying and/or sending the advertisement. For example, a server 14 may send the advertisement when the subscriber terminal is idle or when the subscriber terminal is both idle and substantially stationary. The subscriber terminal may then display the advertisement when received. Alternatively, the server 14 may send the advertisement without considering the occurrence of the one or more triggering events. The subscriber terminal, however, may display the advertisement when the subscriber terminal is idle or when the subscriber terminal is both idle and substantially stationary. If the one or more triggering events do not occur, then the subscriber terminal might be programmed to not display the advertisement.

a. Subscriber Terminal Being Idle

One of the triggering events effecting transmission and/or display of the advertisement is the subscriber terminal being idle. In one exemplary embodiment, the subscriber terminal may wait for the subscriber terminal to be idle for a predetermined period of time before displaying the advertisement on the display screen 72. The subscriber terminal may be idle when there is no user-activity (e.g., key presses) on the character-entry mechanism 66 (FIG. 3) for the predetermined period of time. Such a definition of idle may be well suited to an embodiment where the server sends the advertisement to the subscriber terminal, the subscriber terminal stores the advertisement in memory 68, and the subscriber terminal delays display of the advertisement until the occurrence of the triggering event. When there is no user-activity, the subscriber terminal may display the advertisement on the display screen. Alternatively, the subscriber terminal may wait for the occurrence of additional triggering events to occur before displaying the advertisement.

To determine whether the subscriber terminal is idle, the subscriber terminal may comprise, or receive from the server 14, computer instructions (e.g., a JAVA applet) for implementing an idle counter. The idle counter may count from zero, but be reset to zero each time a key press is registered on the character entry mechanism 66. If the idle counter reaches a predetermined threshold, then the subscriber terminal may be "idle." In a preferred embodiment, the idle time threshold is 30 seconds, but other arrangements are also possible.

Alternatively, instead of the subscriber terminal waiting for the subscriber terminal to be idle, the server 14 may wait for the subscriber terminal to be idle. As such, the server 14 may delay the sending of the advertisement to the subscriber terminal until the subscriber terminal is idle. Then the server 14 may send the advertisement to the subscriber terminal when idle or wait for additional triggering events before sending the advertisement.

The server 14 may determine that the subscriber terminal 30 is idle by receiving an indication from the MSC 38 (FIG. 2) when a call is terminated or dropped. The MSC 38 (FIG. 2) is typically programmed to generate a Call Detail Record (CDR) when a call is terminated or dropped. The CDR is used by a billing server so as to track call usage on an account-by-account basis. When the MSC 38 generates the CDR, the MSC 38 (or other network device) may be programmed to indicate to the server 14 (e.g., by sending message using HTTP messaging protocol) that a call on the subscriber terminal 30 has been terminated or dropped. As such, the server 14 may use the CDR as an indication that the subscriber terminal is idle.

In response to the indication from the MSC 38 that subscriber terminal 30 is idle, the server 14 may send the advertisement to the subscriber terminal.

As there may be a delay between the time the MSC 38 sends the indication and the time that the server 14 decides to send the advertisement, the server 14 may query the MSC 38 associated with the subscriber terminal 30 (e.g., by looking at the home location register) before sending the advertisement. The server 14 may query whether the subscriber terminal 30 is in a call session (i.e., not idle). If the subscriber terminal 30 is idle, then the server 14 may send the advertisement to the subscriber terminal 30. Of course, other arrangements are also possible.

b. Subscriber Terminal Being Substantially Stationary

Another triggering event defining whether the subscriber terminal displays the advertisement may be the subscriber terminal 30 being "substantially stationary." If the subscriber terminal 30 has received the advertisement and determines that it is substantially stationary, then the subscriber terminal 30 may display the advertisement. Alternatively, if the server 14 determines that the subscriber terminal 30 is substantially stationary, then the server 14 may send the advertisement to the subscriber terminal 30, preferably for display. Of course, the server 14 or subscriber terminal 30 may wait for additional triggering events before sending and/or displaying the advertisement.

Substantially stationary may be defined as when the movement of the subscriber terminal 30 varies at less than a predetermined rate. In one embodiment, the server 32 may query the subscriber terminal 30, itself, or a mobile positioning system (MPC) of the communications network for the position of the subscriber terminal 30. In another embodiment, the subscriber terminal 30 may use the GPS 62 to determine its position.

By way of example, Interim Standard 801 (TIA/EIA/JS-801) published by the Telecommunications Industry Association and entitled "Position Determination Standard for Dual Mode Spread Spectrum Systems" (the entirety of which is herein incorporated by reference) describes various methods for determining and conveying mobile terminal position coordinates. One method for determining and conveying mobile terminal position coordinates is Advanced Forward Link Trilateration (A-FLT). A-FLT is a time-synchronized system for determining location of the subscriber terminal 30. The MSC 38 may measure the time difference (phase delay) between pairs of signals and convert the time difference into range information based on fixed reference points (e.g., base station). The range data may be used to form curves at which an intersection is defined for the location of the subscriber station 30.

Using the positional information of the subscriber terminal 30, the server 14, the subscriber terminal 30, or some other entity may calculate a rate of motion of the subscriber terminal 30 to determine whether the subscriber terminal 30 is substantially stationary. The rate of motion of the subscriber terminal 30 may be defined by the following formula, wherein $(x_1,y_1)$ corresponds to a location (e.g., longitude and latitude of the subscriber terminal 30 at time $t_1$ and $(x_2,y_2)$ corresponds to a location (e.g., longitude and latitude of the subscriber terminal) at time $t_2$:

$$Rate = \left| \frac{(x_2, y_2) - (x_1, y_1)}{(t_1 - t_2)} \right|$$

If the motion of the subscriber terminal 30 varies at less than a predetermined rate, the subscriber terminal 30 may be considered substantially stationary. The predetermined rate may vary based on the operating environment of the subscriber terminal 30. For instance, if the subscriber terminal 30 is fixed in an automobile, the predetermined rate may be appropriately set so that the user may receive advertisements when he may be driving in slow traffic. Alternatively, if the subscriber terminal 30 is portable, the predetermined rate may be appropriately set so that the user may receive advertisements while he is walking. Thus, the predetermined rate may be a configurable parameter settable by the network provider or the user of the subscriber terminal 30.

c. Advertisement at Particular Time of Day

Yet another triggering event defining whether the subscriber terminal and server 14 displays and/or sends the advertisement may be an occurrence of a specific time of day. In one exemplary embodiment, the server 14 may send an advertisement for a dinner meal at a fast food restaurant at 5 p.m., e.g., at dinnertime. The subscriber terminal may then display the advertisement. In another exemplary embodiment, the subscriber terminal may receive an advertisement from the server 14, but the subscriber terminal may display the advertisement only at the specific time of day. For example, the server 14 may send an advertisement for a dinner meal at 11 a.m., but the subscriber terminal may not display the advertisement until dinner time, e.g., 5 p.m. As such, the subscriber terminal and the server 14 may have a clock for tracking the time of day.

Again, other arrangements are also possible. For example, the server 14 and/or mobile terminal may wait for additional triggering events before sending/displaying the advertisement.

4. Exemplary Advertisement

Figure 7:
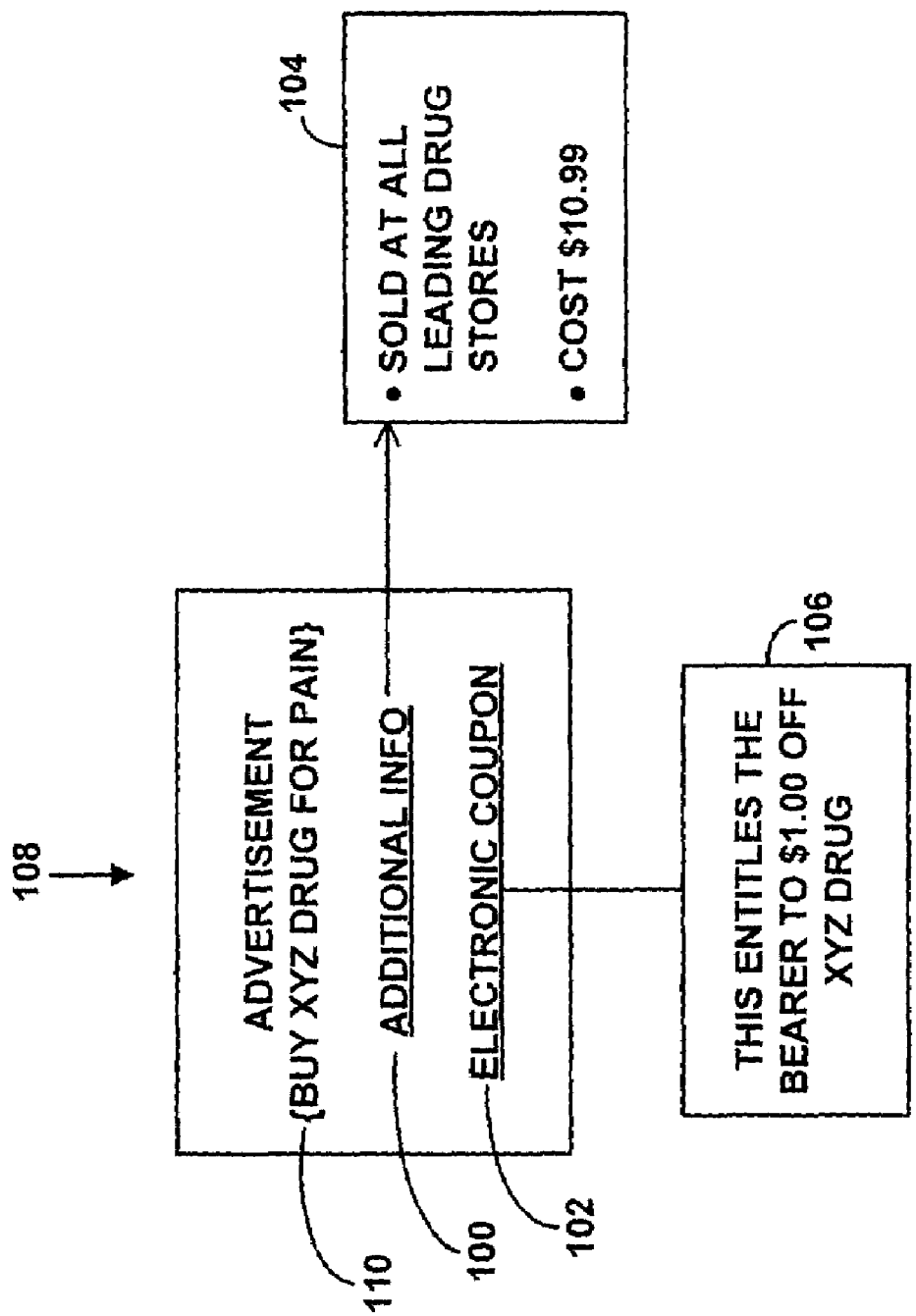
FIG. 7 is an illustration of an exemplary advertisement.

FIG. 7 illustrates an exemplary embodiment of an advertisement 108 as sent by the server 14. The advertisement 108 may comprise text and/or graphics, for example, about a product or service such as "Buy XYZ Drug for Pain" 110. In addition to the information on the actual advertisement, the advertisement may have a URL link 100, 102 (e.g., in an HTML defined advertisement) or a "WAP push" (e.g., in an SMS defined advertisement). The URL link 10, 102 or the WAP push may be selected by the user to view a second advertisement. The second advertisement may have additional information about the product or service being advertised.

The second advertisement 104 may be another web-page. Alternatively, the second advertisement may be electronic mail, instant message, or SMS message displayed as a result of selecting the URL or WAP push, for example.

Still alternatively, the second advertisement may be defined by an electronic coupon 106 as described in U.S. Pat. No. 5,761,648 entitled "Interactive Marketing and Process Using Electronic Certificates," the entirety of which is incorporated by reference. The electronic coupon 106 may be provided by the business that is advertising that allows the bearer of the coupon to receive a discount on the advertised product. The electronic coupon 106 may be printed out so that the user can receive the discount on the purchase of the advertised product or service. Other arrangements are also possible.

Exemplary embodiments of the present invention have thus been illustrated and described. It will be understood, however, that changes and modifications may be made to the invention as described without deviating from the spirit and scope of the invention, as defined by the following claims.

I claim:

1. A method of advertising on a mobile subscriber terminal, the method comprising:
    sending an advertising authorization request via a telecommunications network to the mobile subscriber terminal;
    receiving a reply to the advertising authorization request from the mobile subscriber terminal, the reply providing authorization for at least one advertisement to be sent to the mobile subscriber terminal; and
    in response to the authorization, sending the at least one advertisement to the mobile subscriber terminal when at least one triggering event occurs, wherein the at least one triggering event comprises the mobile subscriber terminal being idle and the mobile subscriber terminal being substantially stationary.

2. The method of claim 1, wherein the advertising authorization request comprises at least one user-selectable option for authorizing the at least one advertisement to be sent to the mobile subscriber terminal.

3. The method of claim 1, wherein the mobile subscriber terminal comprises a display screen, the method further comprising displaying the at least one advertisement on the display screen.

4. The method of claim 1, wherein sending the at least one advertisement to the mobile subscriber terminal when the at least one triggering event occurs comprises executing stored computer instructions at a processor in the telecommunications network for sending the at least one advertisement to the mobile subscriber terminal when the at least one triggering event occurs.

5. The method of claim 1, wherein the function of sending the at least one advertisement to the mobile subscriber terminal when the at least one triggering event occurs is initiated by a server coupled to the telecommunications network.

6. The method of claim 1, further comprising:
    receiving the at least one advertisement at the mobile subscriber terminal; and
    in response to receiving the at least one advertisement at the mobile subscriber terminal, displaying the at least one advertisement on the mobile subscriber terminal.

7. A method of advertising on a mobile subscriber terminal, the method comprising:
    sending an advertising authorization request via a telecommunications network to the mobile subscriber terminal;
    receiving a reply to the advertising authorization request from the mobile subscriber terminal, the reply authorizing at least one advertisement to be sent to the mobile subscriber terminal;
    sending the at least one advertisement to the mobile subscriber terminal in response to receiving the reply; and
    displaying the at least one advertisement on the mobile subscriber terminal in response to the mobile subscriber terminal being idle and substantially stationary.

8. The method of claim 7, wherein the advertising authorization request comprises at least one user-selectable option for authorizing the at least one advertisement to be sent to the mobile subscriber terminal.

9. A method of advertising on a mobile subscriber terminal, the method comprising:
    retrieving a reply to an advertising authorization request from computer readable memory, the reply authorizing at least one advertisement to be sent to the mobile subscriber terminal;
    sending the at least one advertisement to the mobile subscriber terminal in response to retrieving the reply; and
    displaying the at least one advertisement on the mobile subscriber terminal in response to the mobile subscriber terminal being idle and substantially stationary.

* * * * *